(12) United States Patent
Xia et al.

(10) Patent No.: US 11,904,576 B2
(45) Date of Patent: Feb. 20, 2024

(54) HIGH-PERFORMANCE MULTILAYER FILM FOR PACKAGING

(71) Applicant: JIAPU INNOVATIVE FILM (KUNSHAN) CO., LTD., Jiangsu (CN)

(72) Inventors: Jialiang Xia, Suzhou (CN); Xuewen Gao, Suzhou (CN); Yu Xia, Suzhou (CN); Minyan Tang, Suzhou (CN)

(73) Assignee: JIAPU INNOVATIVE FILM (KUNSHAN) CO., LTD., Jiangsu (CN)

( * ) Notice: Subject to any disclaimer, the term of this patent is extended or adjusted under 35 U.S.C. 154(b) by 648 days.

(21) Appl. No.: 16/614,037

(22) PCT Filed: Mar. 15, 2018

(86) PCT No.: PCT/CN2018/079204
§ 371 (c)(1),
(2) Date: Nov. 15, 2019

(87) PCT Pub. No.: WO2018/166510
PCT Pub. Date: Sep. 20, 2018

(65) Prior Publication Data
US 2021/0170725 A1 Jun. 10, 2021

(30) Foreign Application Priority Data
Mar. 15, 2017 (CN) .......................... 201710154185.5

(51) Int. Cl.
| | | |
|---|---|---|
| *B32B 27/36* | (2006.01) | |
| *B32B 27/32* | (2006.01) | |
| *B65D 65/40* | (2006.01) | |
| *B32B 27/08* | (2006.01) | |
| *B32B 27/30* | (2006.01) | |
| *B32B 27/34* | (2006.01) | |

(52) U.S. Cl.
CPC ............ *B32B 27/08* (2013.01); *B32B 27/306* (2013.01); *B32B 27/32* (2013.01); *B32B 27/34* (2013.01); *B32B 27/36* (2013.01); *B65D 65/40* (2013.01); *B32B 2250/05* (2013.01); *B32B 2250/24* (2013.01); *B32B 2307/518* (2013.01); *B32B 2307/72* (2013.01); *B32B 2553/00* (2013.01)

(58) Field of Classification Search
CPC ....... B32B 27/08; B32B 27/306; B32B 27/32; B32B 27/34; B32B 27/36; B32B 2250/05; B32B 2250/24; B32B 2307/518; B32B 2307/72; B32B 2553/00; B32B 2439/46; B32B 2439/70; B65D 65/40
See application file for complete search history.

(56) References Cited

U.S. PATENT DOCUMENTS

| | | | | |
|---|---|---|---|---|
| 2011/0288266 A1* | 11/2011 | Kato | ...................... | B32B 27/36 528/335 |
| 2013/0092590 A1* | 4/2013 | Bellini | ...................... | B32B 1/08 264/171.27 |
| 2013/0164512 A1* | 6/2013 | Yoo | ......................... | B32B 27/38 428/212 |
| 2013/0164535 A1* | 6/2013 | Ryu | ........................ | C08L 33/12 428/407 |
| 2014/0017428 A1* | 1/2014 | Omasa | ............ | B60K 15/03177 428/476.1 |

OTHER PUBLICATIONS

Omnexus (Evidentiary Reference) (https://omnexus.specialchem.com/polymer-properties/properties/density) (Year: 2021).*

* cited by examiner

*Primary Examiner* — Prashant J Khatri
*Assistant Examiner* — Daniel P Dillon
(74) *Attorney, Agent, or Firm* — Oliff PLC

(57) ABSTRACT

A high-performance multilayer films for packaging and the structure of the multilayer film is as follows: PO2/POY/PO1/POX/PO3 and PO2/POY/PO1/TIE2/PO3. The multilayer film is obtained by multilayer coextrusion and biaxial stretching. The total thickness of the multilayer film is 8 to 100 micrometers; the absolute values of the differences of the solubility parameters between the PO1 layer and the PO2 layer and between the PO2 layer and PO3 layer is greater than 0.5 $(J \cdot cm^{-3})^{1/2}$, and the absolute value of the difference of the cohesive energy density is greater than 5 $J/cm^3$.

4 Claims, No Drawings

HIGH-PERFORMANCE MULTILAYER FILM FOR PACKAGING

TECHNICAL FIELD

The present invention relates to the technical field of multilayer films, particularly to a high-performance multilayer film for packaging. The multilayer film can be applied to vacuum packaging, gas packaging, modified atmosphere packaging, high temperature cooking packaging, aseptic packaging, and coating, printing and composite substrates, etc.

BACKGROUND OF INVENTION

Multilayer co-extruded film is the film made with several types of polymers by methods of co-extrusion blowing, casting or orientation. As plastic packaging material, this kind of film is widely used in food, processed meat, daily necessity, cosmetics, chemical, pesticide and military products etc. And it can realize the sealed flexible packaging of products and meet various packaging functions such as inflation or vacuuming, thermoforming, modified atmosphere packaging, high temperature cooking packaging, aseptic packaging, etc, as well as providing barrier function such as moisture, oxygen, oil and aroma barrier etc. in various circumstances.

In the food packaging industry, the vacuum packaging, gas packaging, modified atmosphere packaging, high temperature cooking packaging, aseptic packaging and coating, printing composite substrates are widely used. In the vacuum packaging, the food is put into the packaging bag, the air in the package bag is removed and the bag is sealed after it reaches the predetermined vacuum degree with the main function to remove the oxygen to prevent the food from spoilage. In the gas packaging, a single gas of nitrogen, carbon dioxide or oxygen or a mixture of the two or three gases is charged after the vacuum-pumping. In the modified atmosphere packaging, the modified atmosphere fresh-keeping gas (2 or 4 kinds of gases mixed according to the characteristics of the food characteristics) is used to replace the air in the packaging bag to change the external environment of the food in the package, inhibit the growth and reproduction of bacteria, slow down the metabolic rate of fresh food, and extend the refreshing time or shelf life of the food.

The aseptic packaging refers to a packaging method to seal the products that have been sterilized and have reached the commercial sterility (liquid milk and dairy products, beverages, etc.) in a sterilized container, fill in the products in a sterile environment and keep the packaging containers sealed after the filling. The composite flexible packaging film has been simultaneously developed with the vacuum packaging, gas packaging, modified atmosphere packaging and high temperature cooking packaging, aseptic packaging and coating, printing, composite substrate technology and the key to vacuum packaging, gas packaging, modified atmosphere packaging and high temperature cooking packaging, aseptic packaging and coating, printing composite substrate technology is to maintain the barrier function and excellent heat-sealing property of the packaging film. In order to achieve the goal of environmental protection and production reduction, the multi-layer co-extrusion process is used to achieve zero emission of VOCs and the biaxial stretching molding process is used to guarantee the strength when the film is thin to a certain extent.

However, as the processing characteristics of materials at different layers of the multi-layer high barrier film are different and the molding technology for simultaneous coextrusion and biaxial stretching under the same process conditions is limited by the prior art, the interlayer peel strength and heat-sealing property of the film cannot be guaranteed.

The prior art has the following problems: 1. The materials at different layers of the multi-layer high barrier film are different, and the stretching ratios of different materials are different, and when the material layer of the smaller stretching ratio is stretched to the same ratio as the material layer of the larger stretching ratio, the interlayer peel strength is drastically lowered or it may even be delaminated, and the material of the smaller stretching ratio is likely to be torn; 2. The heat-sealing property is lowered after the stretching; 3. In order to make the stretched film have the sufficient heat-sealing property, the stretched film is usually laminated with a heat-sealing layer, but the dry composite solvent used in the lamination contains the pollutant, which is unsafe for food and environmentally unfriendly.

The object of the present invention is to provide a high-performance multilayer film for packaging.

To achieve above object, the first technical solution adopted in this invention is: a high-performance multilayer film for packaging, and the innovation is: the structure of the multilayer film is as follows:

PO2/POY/PO1/POX/PO3  Structure (1)

In Structure (1), explicated from left to right:

PO2 represents an outer layer, also known as a PO2 layer, and the material is any one or a mixture of at least two of polyethylene, polypropylene, modified polyethylene and modified polypropylene;

POY represents a stretching transition bridge, also known as a POY bridge, and the material is any one or a mixture of at least two of polyethylene, polypropylene, modified polyethylene and modified polypropylene; Y represents the number of layers, and Y is 2, 3, 4, . . . ;

PO1 represents a main tensile layer, also known as PO1 layer, and the material is polyamide or ethylene-vinyl alcohol copolymer, or polyester;

POX represents a stretching transition bridge, also known as a POX bridge, and the material is any one or a mixture of at least two of polyethylene, polypropylene, modified polyethylene and modified polypropylene; X represents the number of layers, and X is 2, 3, 4, . . . ;

PO3 represents an inner layer, also known as a PO3 layer, and the material is any one or a mixture of at least two of polyethylene, polypropylene, modified polyethylene and modified polypropylene;

The multilayer film in structure (1) is obtained once by multilayer coextrusion and biaxial stretching, wherein, the biaxial stretching is carried out by a two-step stretching method of longitudinal stretching first and transverse stretching later;

The total thickness of the multilayer film is 8 micrometers to 100 micrometers, the thickness of the PO2 layer is 8 to 20% of the total thickness of the multilayer film; the thickness of the POY bridge is 10 to 20% of the total thickness of the multilayer film; the thickness of the PO1 layer is 30 to 50% of the total thickness of the multilayer film; the thickness of the POX bridge is 10 to 20% of the total thickness of the multilayer film; the thickness of the PO3 layer is 8 to 20% of the total thickness of the multilayer film;

The selection requirements for the density of materials of the PO2 layer, the POY bridge, PO1 layer, the POX bridge and the PO3 layer are as follows: When the PO1 layer is polyamide, the density of the PO1 layer is 1.12~1.14 g/cm$^3$; when the PO1 layer is ethylene-vinyl alcohol copolymer, the density of the PO1 layer is 1.16~1.19 g/cm$^3$; when the PO1 layer is polyester, the density of the PO1 layer is 1.3~1.4 g/cm$^3$; the density of the PO2 layer is 0.87~0.97 g/cm$^3$; the density of the POY bridge is 0.86~0.97 g/cm$^3$; the density of the POX bridge is 0.86~0.97 g/cm$^3$; the density of the PO3 layer is 0.87~0.97 g/cm$^3$; The absolute value of the difference of the solubility parameters between the PO1 layer and the PO2 layer is greater than 0.5 (J·cm$^{-3}$)$^{1/2}$, and the absolute value of the difference of the cohesive energy density between the PO1 layer and PO2 layer is greater than 5 J/cm$^3$, and the POY bridge is provided with a 1st bonding layer inside and the 1st bonding layer contacts the PO1 layer and it makes the absolute value of the difference of the solubility parameters between the 1st bonding layer and the PO2 layer greater than or equal to 0.1 (J·cm$^{-3}$)$^{1/2}$, and less than or equal to 0.5 (J·cm$^{-3}$)$^{1/2}$ and makes the absolute value of the difference of the cohesive energy density between the 1st bonding layer and PO2 layer greater than or equal to 3 J/cm$^3$, and less than or equal to 5 J/cm$^3$, and the solubility parameter and the cohesive energy density of the 1st bonding layer in the POY bridge and the PO2 layer are based on one of the 1st bonding layer material and the PO2 layer material, and it's transitioned to the other in a gradient way; The absolute value of the difference of the solubility parameters between adjacent layers from the PO1 layer to the POY bridge and to the PO2 layer is less than or equal to 0.1 (J·cm$^{-3}$)$^{1/2}$, and meanwhile, the absolute value of the difference of the cohesive energy density between adjacent layers is less than or equal to 3 J/cm$^3$;

The material of the 1st bonding layer is a maleic anhydride grafted copolymer with an adjacent layer as a carrier and the carrier is at least one of materials in the POY bridge that are in direct contact with the 1st bonding layer;

The absolute value of the difference of the solubility parameters between the PO1 layer and the PO3 layer is greater than 0.5 (J·cm$^{-3}$)$^{1/2}$, and the absolute value of the difference of the cohesive energy density between the PO1 layer and PO3 layer is greater than 5 J/cm$^3$, and the POY bridge is provided with a 2nd bonding layer inside and the 2nd bonding layer contacts the PO1 layer and it makes the absolute value of the difference of the solubility parameters between the 2nd bonding layer and the PO3 layer greater than or equal to 0.1 (J·cm$^{-3}$)$^{1/2}$, and less than or equal to 0.5 (J·cm$^{-3}$)$^{1/2}$ and makes the absolute value of the difference of the cohesive energy density between the 2nd bonding layer and PO3 layer greater than or equal to 3 J/cm$^3$, and less than or equal to 5 J/cm$^3$, and the solubility parameter and the cohesive energy density of the 2nd bonding layer in the POX bridge and the PO3 layer are based on one of the 2nd bonding layer material and the PO3 layer material, and it's transitioned to the other in a gradient way;

The absolute value of the difference of the solubility parameters between adjacent layers from the PO1 layer to the POX bridge and to the PO3 layer is less than or equal to 0.1 (J·cm$^{-3}$)$^{1/2}$, and the absolute value of the difference of the cohesive energy density between adjacent layers is less than or equal to 3 J/cm$^3$;

The material of the 2nd bonding layer is a maleic anhydride grafted copolymer with an adjacent layer as a carrier and the carrier is at least one of materials in the POX bridge that are in direct contact with the 2nd bonding layer.

To achieve above object, the second technical solution adopted in this invention is: a high-performance multilayer film for packaging, and the innovation is: the structure of the multilayer film is as follows:

PO2/POY/PO1/TIE2/PO3    Structure (2)

In Structure (2), explicated from left to right:

PO2 represents an outer layer, also known as a PO2 layer, and the material is any one or a mixture of at least two of polyethylene, polypropylene, modified polyethylene and modified polypropylene;

POY represents a stretching transition bridge, also known as a POY bridge, and the material is any one or a mixture of at least two of polyethylene, polypropylene, modified polyethylene and modified polypropylene; Y represents the number of layers, and Y is 2, 3, 4, . . . ;

PO1 represents a main tensile layer, also known as PO1 layer, and the material is polyamide or ethylene-vinyl alcohol copolymer, or polyester;

TIE2 represents a 2nd bonding layer, and the material is a maleic anhydride grafted copolymer with an adjacent layer as a carrier and the carrier is at least one of materials in the PO3 layer;

PO3 represents an inner layer, also known as a PO3 layer, and the function is a heat-sealing layer and the material is any one or a mixture of at least two of polyethylene, polypropylene, modified polyethylene and modified polypropylene;

The multilayer film in structure (1) is obtained once by multilayer coextrusion and biaxial stretching, wherein, the biaxial stretching is carried out by a two-step stretching method of longitudinal stretching first and transverse stretching later;

The total thickness of the multilayer film is 8 micrometers to 100 micrometers, and the thickness of the PO2 layer is 8 to 20% of the total thickness of the multilayer film; the thickness of the POY layer is 10 to 20% of the total thickness of the multilayer film; the thickness of the PO1 layer is 30 to 50% of the total thickness of the multilayer film;

The selection requirements for the density of materials of the PO2 layer, the POY bridge and PO1 layer are as follows: When the PO1 layer is polyamide, the density of the PO1 layer is 1.12~1.14 g/cm$^3$; when the PO1 layer is ethylene-vinyl alcohol copolymer, the density of the PO1 layer is 1.16~1.19 g/cm$^3$; when the PO1 layer is polyester, the density of the PO1 layer is 1.3~1.4 g/cm$^3$; the density of the PO2 layer is 0.87~0.97 g/cm$^3$; the density of the POY bridge is 0.86~0.97 g/cm$^3$;

The absolute value of the difference of the solubility parameters between the PO1 layer and the PO2 layer is greater than 0.5 (J·cm$^{-3}$)$^{1/2}$, and the absolute value of the difference of the cohesive energy density between the PO1 layer and PO2 layer is greater than 5 J/cm$^3$, and the POY bridge is provided with a 1st bonding layer inside and the 1st bonding layer contacts the PO1 layer and it makes the absolute value of the difference of the solubility parameters between the 1st bonding layer and the PO2 layer greater than or equal to 0.1 (J·cm$^{-3}$)$^{1/2}$, and less than or equal to 0.5 (J·cm$^{-3}$)$^{1/2}$ and makes the absolute value of the difference of the cohesive energy density between the 1st bonding layer and PO2 layer greater than or equal to 3 J/cm³, and less than or equal to 5 J/cm³, and the solubility parameter and the cohesive energy density of the 1st bonding layer in the POY bridge and the PO2 layer are based on one of the 1st bonding layer material and the PO2 layer material, and it's transitioned to the other in a gradient way;

The absolute value of the difference of the solubility parameters between adjacent layers from the PO1 layer to the POY bridge and to the PO2 layer is less than or equal to 0.1 $(J \cdot cm^{-3})^{1/2}$, and the absolute value of the difference of the cohesive energy density between adjacent layers is less than or equal to 3 J/cm³;

The material of the 1st bonding layer is a maleic anhydride grafted copolymer with an adjacent layer as a carrier and the carrier is at least one of materials in the POY bridge that are in direct contact with the 1st bonding layer.

The above described technical solution is explained as follows:

1. In above described first and second technical solutions, the solubility parameter and the cohesive energy density of the POY bridge material are based on one of the PO1 layer material and the PO2 layer material, and it's transitioned to the other in an increment or decrement way;
2. In above described first technical solution, the solubility parameter and the cohesive energy density of the PDX bridge material are based on one of the PO1 layer material and the PO3 layer material, and it's transitioned to the other in an increment or decrement way;
3. In above described first and second technical solutions, the solubility parameter and the cohesive energy density of the POY bridge material are based on one of the PO1 layer material and the PO2 layer material, and it's transitioned to the other in a V-shaped gradient way.
4. In above described first technical solution, the solubility parameter and the cohesive energy density of the PDX bridge material are based on one of the PO1 layer material and the PO3 layer material, and it's transitioned to the other in a V-shaped gradient way;
5. In above described first and second technical solutions, the solubility parameter and the cohesive energy density of the POY bridge material are based on one of the PO1 layer material and the PO2 layer material, and it's transitioned to the other in a W-shaped gradient way.
6. In above described first technical solution, the solubility parameter and the cohesive energy density of the PDX bridge material are based on one of the PO1 layer material and the PO3 layer material, and it's transitioned to the other in a W-shaped gradient way;
7. In above described first and second technical solutions, the solubility parameter and the cohesive energy density of the POY bridge material are based on one of the PO1 layer material and the PO2 layer material, and it's transitioned to the other in a M-shaped gradient way.
8. In above described first technical solution, the solubility parameter and the cohesive energy density of the PDX bridge material are based on one of the PO1 layer material and the PO3 layer material, and it's transitioned to the other in an M-shaped gradient way;

The technical principle and advantage of the present invention: the solubility parameter (referred to as SP) is a physical constant for measuring the compatibility of a polymer material under processing conditions (including liquid state of rubber and plastic under processing conditions).

The cohesive energy density is the energy E (cohesive energy) required for the vaporization of 1 mol of condensate per unit volume V to overcome the intermolecular force. It is a physical variable evaluating the magnitude of the intermolecular forces and mainly reflecting the interaction between the groups. In general, the greater the polarity of the groups contained in the molecules, the greater the force between the molecules, and the greater the corresponding cohesive energy density; and vice versa.

The physical meaning of the solubility parameter is the square root of the cohesive energy density per unit volume of the material: $SP=(E/V)^{1/2}$, wherein, SP is the solubility parameter, E is the cohesive energy, V is the volume, and E/V is the cohesive energy density.

The technical principle and advantages of the present invention: understanding the solubility parameter is to grasp the degree of compatibility between different polymers, and provide a basis for successful blending. The closer the solubility parameters of the two high polymer materials are, the better the blending effect is. If the difference between the two exceeds 0.5 $(J \cdot cm^{-3})^{1/2}$, it is generally difficult to blend evenly, and it is necessary to add the solubilizer. The function of the solubilizer is to reduce the surface tension of the two phases so that the surface at the interface is actuated, thereby increasing the degree of compatibility. The solubilizer is often a polymer that acts as a bridge intermediary. In the present invention, the stretching transition bridge acts as a solubilizer and a bridge intermediary.

Two important factors influencing the multilayer co-extrusion biaxial stretching of multilayer film are the solubility parameters and density of interlayer materials, and the cohesive energy density is the cohesive energy per unit volume of the material, and the cohesive energy density is proportional to the material density and the melting point/softening temperature of the material. The invention is based on the same or similar cohesive energy density and solubility parameter of the polymer as the basis for setting the stretching transition bridge (e.g. POY bridge), that is, in accordance with the basic rule of like dissolves like of organics. The closer the solubility parameters and cohesive energy density of the two high polymer materials are, the better the blending effect is. The difference between the solubility parameters and the cohesive energy density of the interlayer material is narrowed through the stretching transition bridge to eliminate or weaken the internal stress between the structural layers, improve the peel strength and heat-sealing strength, and realize the biaxial stretching of the multilayer co-extruded film.

In the present invention, the absolute values of the differences of the solubility parameters between the PO1 layer and the PO2 layer and between the PO2 layer and PO3 layer is greater than 0.5 $(J \cdot cm^{-3})^{1/2}$, and the absolute value of the difference of the cohesive energy density is greater than 5 J/cm³. In order to satisfy the requirements of the compatibility, the biaxial stretching and the thickness of the stretching transition bridge accounting for 10~20% of the total thickness of the multilayer film, the POY bridge is provided with the 1st bonding layer at one end in the present invention and the chemical connection is applied to adjust the absolute value of the difference of the solubility parameter to the range of 0.1~0.5 $(J \cdot cm^{-3})^{1/2}$ and adjust the absolute value of the difference of the cohesive energy density to the range of 3~5 J/cm³, and then the solubility parameter and the cohesive energy density of the material between the 1st bonding layer in the POY bridge and the PO2 layer are based on one of the 1st bonding layer material and the PO2 layer material, and it's transitioned to the other in a gradient way. The principle of the POX bridge is the same as that of the POY bridge.

The present invention increases the strength by the biaxial stretching process to make ordered arrangement of molecules.

SPECIFIC EMBODIMENT

With reference to the embodiments, the present invention will be described in detail: Embodiments 1 to 6 are embodiments of the first technical solution of the present invention.

Embodiment 1

In the structure of multilayer film, PO2 is polypropylene; POY is high density polyethylene/high density polyethylene+ethylene-octene copolymer/linear low density polyethylene+low density polyethylene/maleic anhydride grafted linear low density polyethylene, the number of layers is three; PO1 is the polyamide; POX is maleic anhydride grafted linear low density polyethylene/linear low density polyethylene+low density polyethylene/high density polyethylene+ethylene-octene copolymer/high density polyethylene, the number of layers is four; PO3 is polypropylene. See Table 1:

The density, solubility parameter and cohesive energy density of each polymer can be seen in Table 1, and the absolute value of the difference of the solubility parameters between the PO1 layer and the PO2 layer material is 5.7 $(J \cdot cm^{-3})^{1/2}$, and 5.7 $(J \cdot cm^{-3})^{1/2} > 5$ $(J \cdot cm^{-3})^{1/2}$, and the POY bridge is provided with a 1st bonding layer maleic anhydride grafted linear low density polyethylene and the 1st bonding layer contacts the PO1 layer, and it makes the absolute value of the difference of the solubility parameters between the 1st bonding layer and the PO2 layer material to be 0.2 $(J \cdot cm^{-3})^{1/2}$, 0.1 $(J \cdot cm^{-3})^{1/2} < 0.2$ $(J \cdot cm^{-3})^{1/2} < 0.5$ $(J \cdot cm^{-3})^{1/2}$, and meanwhile, it makes the absolute value of the difference of the cohesive energy density between the 1st bonding layer and PO2 layer material to be 3.2 $J/cm^3$, 3 $J/cm^3 < 3.2$ $J/cm^3 < 5$ $J/cm^3$, and the solubility parameter and the cohesive energy density of the material between the 1st bonding layer in the POY bridge and the PO2 layer are based on the 1st bonding layer material and transitioned to PO2 layer in an increment way;

The absolute value of the difference of the solubility parameters between adjacent layers from the PO1 layer to the POY bridge and to the PO2 layer is less than or equal to 0.1 $(J \cdot cm^{-3})^{1/2}$, and the absolute value of the difference of the cohesive energy density between adjacent layers is less than 3 $J/cm^3$;

TABLE 1

| Layer | Polymer | Density $(g/cm^3)$ | Solubility parameter $(J \cdot cm^{-3})^{1/2}$ | Absolute value of the difference of the solubility parameters between adjacent layers $(J \cdot cm^{-3})^{1/2}$ | Cohesive energy density $(J/cm^3)$ | Absolute value of the difference of the cohesive energy density between adjacent layers $(J/cm^3)$ |
|---|---|---|---|---|---|---|
| PO2 | Polypropylene (homopolymerization) PP | 0.9000 | 8.10 | 0.10 | 65.61 | 1.61 |
| POY | High density polyethylene HDPE | 0.9600 | 8.00 | | 64.00 | |
| | High density polyethylene HDPE + ethylene-octene copolymer | 0.9472 | 7.95 | 0.05 | 63.20 | 0.80 |
| | Linear low density polyethylene LLDPE + low density polyethylene LDPE | 0.9320 | 7.93 | 0.02 | 62.88 | 0.32 |
| | Maleic anhydride grafted linear low density polyethylene LDPE | 0.9250 | 7.90 | 0.03 | 62.41 | 0.47 |
| PO1 | Polyamide PA | 1.1300 | 13.80 | 5.90 | 190.44 | 128.03 |
| POX | Maleic anhydride grafted linear low density polyethylene LDPE | 0.9250 | 7.90 | 5.90 | 62.41 | 128.03 |
| | Linear low density polyethylene LLDPE + low density polyethylene LDPE | 0.9230 | 7.93 | 0.03 | 62.88 | 0.47 |
| | High density polyethylene HDPE + ethylene-octene copolymer | 0.9472 | 7.95 | 0.02 | 63.20 | 0.32 |
| | High density polyethylene HDPE | 0.9600 | 8.00 | 0.05 | 64.00 | 0.80 |
| PO3 | Polypropylene PP | 0.9050 | 8.10 | 0.10 | 65.61 | 1.61 |

The material of the 1st bonding layer is a maleic anhydride grafted copolymer with an adjacent layer as a carrier and the carrier is the material in the POY bridge that is in direct contact with the 1st bonding layer (linear low density polyethylene).

The absolute value of the difference of the solubility parameters between the PO1 layer and the PO3 layer material is 5.7 $(J \cdot cm^{-3})^{1/2}$, 5.7 $(J \cdot cm^{-3})^{1/2} > 5$ $(J \cdot cm^{-3})^{1/2}$, and the POX bridge is provided with a 2nd bonding layer maleic anhydride grafted linear low density polyethylene and the 2nd bonding layer contacts the PO1 layer, and it makes the absolute value of the difference of the solubility parameters between the 2nd bonding layer and the PO3 layer material to be 0.2 $(J \cdot cm^{-3})^{1/2}$, 0.1 $(J \cdot cm^{-3})^{1/2} < 0.2$ $(J \cdot cm^{-3})^{1/2} < 0.5$ $(J \cdot cm^{-3})^{1/2}$, and meanwhile, it makes the absolute value of the difference of the cohesive energy density between the 2nd bonding layer and PO3 layer material to be 3.2 $J/cm^3$, 3 $J/cm^3 < 3.2$ $J/cm^3 < 5$ $J/cm^3$, and the solubility parameter and the cohesive energy density of the material between the 2nd bonding layer in the POX bridge and the PO3 layer are based on the 2nd bonding layer material and transitioned to PO3 layer in an increment way; the absolute value of the difference of the solubility parameters between adjacent layers from the PO1 layer to the POX bridge and to the PO3 layer is less than or equal to 0.1 $(J \cdot cm^{-3})^{1/2}$, and the absolute value of the difference of the cohesive energy density between adjacent layers is less than 3 $J/cm^3$.

The material of the 2nd bonding layer is a maleic anhydride grafted copolymer with an adjacent layer as a carrier and the carrier is the material in the POX bridge that is in direct contact with the 2nd bonding layer (linear low density polyethylene).

The following embodiments are presented in a table, and no more detailed description is made by text to save space.

Embodiment 2

See Table 2:

TABLE 2

| Layer | Polymer | Density $(g/cm^3)$ | Solubility parameter $(J \cdot cm^{-3})^{1/2}$ | Absolute value of the difference of the solubility parameters between adjacent layers $(J \cdot cm^{-3})^{1/2}$ | Cohesive energy density $(J/cm^3)$ | Absolute value of the difference of the cohesive energy density between adjacent layers $(J/cm^3)$ |
|---|---|---|---|---|---|---|
| PO2 | Polypropylene (homopolymerization) PP | 0.9000 | 8.10 | 0.10 | 65.61 | 1.61 |
| POY | High density polyethylene HDPE | 0.9600 | 8.00 | | 64.00 | |
| | High density polyethylene HDPE + ethylene-octene copolymer | 0.9472 | 7.95 | 0.05 | 63.20 | 0.80 |
| | Linear low density polyethylene LLDPE + low density polyethylene LDPE | 0.9320 | 7.93 | 0.02 | 62.88 | 0.32 |
| | Maleic anhydride grafted linear low density polyethylene LDPE | 0.9200 | 7.90 | 0.03 | 62.41 | 0.47 |
| PO1 | Ethylene-vinyl alcohol copolymer LDPE | 1.1600 | 12.90 | 5.00 | 166.41 | 104.00 |
| POX | Maleic anhydride grafted linear low density polyethylene LDPE | 0.9200 | 7.85 | 5.05 | 61.62 | 104.79 |
| | Linear low density polyethylene LLDPE + low density polyethylene LDPE | 0.9230 | 7.93 | 0.08 | 62.88 | 1.26 |
| | High density polyethylene HDPE + ethylene-octene copolymer | 0.9472 | 7.95 | 0.02 | 63.20 | 0.32 |
| | High density polyethylene HDPE | 0.9600 | 8.00 | 0.05 | 64.00 | 0.80 |
| PO3 | Modified polypropylene PP + high density polyethylene HDPE | 0.9050 | 8.05 | 0.05 | 64.80 | 0.80 |

The solubility parameter and the cohesive energy density of the material between the 1st bonding layer in the POY bridge and the PO2 layer are based on the 1st bonding layer material and transitioned to PO2 layer in an increment way; the solubility parameter and the cohesive energy density of the material between the 2nd bonding layer in the PDX bridge and the PO3 layer are based on the 2nd bonding layer material and transitioned to PO3 layer in an increment way.

Embodiment 3

See Table 3:

TABLE 3

| Layer | Polymer | Density (g/cm³) | Solubility parameter (J · cm⁻³)^(1/2) | Absolute value of the difference of the solubility parameters between adjacent layers (J · cm⁻³)^(1/2) | Cohesive energy density (J/cm³) | Absolute value of the difference of the cohesive energy density between adjacent layers (J/cm³) |
|---|---|---|---|---|---|---|
| PO2 | Polypropylene (homopolymerization) PP | 0.9000 | 8.10 | 0.10 | 65.61 | 1.61 |
| POY | High density polyethylene HDPE | 0.9600 | 8.00 | | 64.00 | |
| | High density polyethylene HDPE + ethylene-octene copolymer | 0.9500 | 7.95 | 0.05 | 63.20 | 0.80 |
| | Low density polyethylene LDPE | 0.9250 | 7.90 | 0.05 | 62.41 | 0.79 |
| | Maleic anhydride grafted linear low density polyethylene LDPE | 0.9250 | 7.90 | 0.00 | 62.41 | 0.00 |
| PO1 | Polyamide PA | 1.1300 | 13.80 | 5.90 | 190.44 | 128.03 |
| POX | Maleic anhydride grafted modified polyethylene EVA | 0.9220 | 8.11 | 5.69 | 65.77 | 124.67 |
| | Linear low density polyethylene LDPE + Modified polyethylene EVA | 0.9200 | 7.95 | 0.16 | 63.20 | 2.57 |
| PO3 | Ethylene-octene copolymer + high density polyethylene HDPE | 0.9472 | 7.95 | 0.00 | 63.20 | 0.00 |

The solubility parameter and the cohesive energy density of the material between the 1st bonding layer in the POY bridge and the PO2 layer are based on the 1st bonding layer material and transitioned to PO2 layer in an increment way; the solubility parameter and the cohesive energy density of the material between the 2nd bonding layer in the PDX bridge and the PO3 layer are based on the 2nd bonding layer material and transitioned to PO3 layer in a decrement way.

Embodiment 4

See Table 4:

TABLE 4

| Layer | Polymer | Density (g/cm³) | Solubility parameter (J · cm⁻³)^(1/2) | Absolute value of the difference of the solubility parameters between adjacent layers (J · cm⁻³)^(1/2) | Cohesive energy density (J/cm³) | Absolute value of the difference of the cohesive energy density between adjacent layers (J/cm³) |
|---|---|---|---|---|---|---|
| PO2 | Polypropylene (homopolymerization) PP | 0.9000 | 8.10 | 0.10 | 65.61 | 1.61 |
| POY | High density polyethylene HDPE | 0.9600 | 8.00 | | 64.00 | |
| | High density polyethylene HDPE + ethylene-octene copolymer | 0.9500 | 7.95 | 0.05 | 63.20 | 0.80 |
| | Low density polyethylene LDPE | 0.9200 | 7.90 | 0.05 | 62.41 | 0.79 |
| | Maleic anhydride grafted linear low density polyethylene LDPE | 0.9200 | 7.90 | 0.00 | 62.41 | 0.00 |
| PO1 | Ethylene-octenol copolymer EVOH LDPE | 1.1700 | 12.90 | 5.00 | 166.41 | 104.00 |

TABLE 4-continued

| Layer | Polymer | Density (g/cm$^3$) | Solubility parameter (J · cm$^{-3}$)$^{1/2}$ | Absolute value of the difference of the solubility parameters between adjacent layers (J · cm$^{-3}$)$^{1/2}$ | Cohesive energy density (J/cm$^3$) | Absolute value of the difference of the cohesive energy density between adjacent layers (J/cm$^3$) |
|---|---|---|---|---|---|---|
| POX | Maleic anhydride grafted low density polyethylene LDPE | 0.9200 | 7.95 | 4.95 | 63.20 | 103.21 |
|  | Linear low density polyethylene LLDPE + low density polyethylene LDPE | 0.9200 | 7.90 | 0.05 | 62.41 | 0.79 |
| PO3 | Ethylene-octene copolymer + high density polyethylene HDPE | 0.9500 | 7.95 | 0.05 | 63.20 | 0.79 |

The solubility parameter and the cohesive energy density of the material between the 1st bonding layer in the POY bridge and the PO2 layer are based on the 1st bonding layer material and transitioned to PO2 layer in an increment way; the solubility parameter and the cohesive energy density of the material between the 2nd bonding layer in the PDX bridge and the PO3 layer are based on the 2nd bonding layer material and transitioned to PO3 layer in a V-shaped way.

Embodiment 5

See Table 5:

TABLE 5

| Layer | Polymer | Density (g/cm$^3$) | Solubility parameter (J · cm$^{-3}$)$^{1/2}$ | Absolute value of the difference of the solubility parameters between adjacent layers (J · cm$^{-3}$)$^{1/2}$ | Cohesive energy density (J/cm$^3$) | Absolute value of the difference of the cohesive energy density between adjacent layers (J/cm$^3$) |
|---|---|---|---|---|---|---|
| PO2 | Polypropylene PP | 0.9000 | 8.00 | 0.10 | 64.00 | 1.59 |
| POY | High density polyethylene HDPE + ethylene-octene copolymer | 0.9500 | 7.90 |  | 62.41 |  |
|  | Low density polyethylene LDPE + ethylene-octene copolymer | 0.9200 | 7.85 | 0.05 | 61.62 | 0.79 |
|  | Maleic anhydride grafted linear low density polyethylene LDPE + ethylene-octene copolymer | 0.9200 | 7.85 | 0.00 | 61.62 | 0.00 |
| PO1 | Polyamide PA | 1.1300 | 13.80 | 5.95 | 190.44 | 128.82 |
| POX | Maleic anhydride grafted low density polyethylene LDPE | 0.9100 | 7.95 | 5.85 | 63.20 | 127.24 |
|  | Linear low density polyethylene LDPE + ethylene-octene copolymer | 0.9250 | 7.90 | 0.05 | 62.41 | 0.79 |
| PO3 | High density polyethylene HDPE + ethylene-octene copolymer | 0.9500 | 7.85 | 0.05 | 61.62 | 0.79 |

The solubility parameter and the cohesive energy density of the material between the 1st bonding layer in the POY bridge and the PO2 layer are based on the 1st bonding layer material and transitioned to PO2 layer in an increment way; the solubility parameter and the cohesive energy density of the material between the 2nd bonding layer in the PDX bridge and the PO3 layer are based on the 2nd bonding layer material and transitioned to PO3 layer in a decrement way.

Embodiment 6

See Table 6:

TABLE 6

| Layer | Polymer | Density (g/cm$^3$) | Solubility parameter (J · cm$^{-3}$)$^{1/2}$ | Absolute value of the difference of the solubility parameters between adjacent layers (J · cm$^{-3}$)$^{1/2}$ | Cohesive energy density (J/cm$^3$) | Absolute value of the difference of the cohesive energy density between adjacent layers (J/cm$^3$) |
|---|---|---|---|---|---|---|
| PO2 | High density polyethylene HDPE | 0.9600 | 8.00 | 0.05 | 64.00 | 0.80 |
| POY | High density polyethylene HDPE + ethylene-octene copolymer | 0.9500 | 7.95 | | 63.2 | |
| | Low density polyethylene LDPE | 0.9200 | 7.90 | 0.05 | 62.41 | 0.79 |
| | Maleic anhydride grafted linear low density polyethylene LDPE | 0.9200 | 7.80 | 0.10 | 60.84 | 1.57 |
| PO1 | Ethylene-vinyl alcohol copolymer EVOH | 1.1700 | 12.90 | 5.10 | 166.41 | 105.57 |
| POX | Maleic anhydride grafted low density polyethylene LDPE | 0.9200 | 7.90 | 5.00 | 62.41 | 104.00 |
| | Low density polyethylene LDPE + high density polyethylene HDPE | 0.9500 | 8.00 | 0.10 | 64.00 | 1.59 |
| PO3 | Polypropylene PP | 0.9000 | 8.10 | 0.10 | 65.61 | 1.61 |

The solubility parameter and the cohesive energy density of the material between the 1st bonding layer in the POY bridge and the PO2 layer are based on the 1st bonding layer material and transitioned to PO2 layer in a W-shaped way; the solubility parameter and the cohesive energy density of the material between the 2nd bonding layer in the PDX bridge and the PO3 layer are based on the 2nd bonding layer material and transitioned to PO3 layer in an increment way.

Embodiment 7

See Table 7:

TABLE 7

| Layer | Polymer | Density (g/cm$^3$) | Solubility parameter (J · cm$^{-3}$)$^{1/2}$ | Absolute value of the difference of the solubility parameters between adjacent layers (J · cm$^{-3}$)$^{1/2}$ | Cohesive energy density (J/cm$^3$) | Absolute value of the difference of the cohesive energy density between adjacent layers (J/cm$^3$) |
|---|---|---|---|---|---|---|
| PO2 | Polypropylene (homopolymerization) PP | 0.9000 | 8.01 | 0.10 | 64.16 | 1.61 |
| POY | High density polyethylene HDPE + | 0.9600 | 8.11 | | 65.77 | |

TABLE 7-continued

| Layer | Polymer | Density (g/cm³) | Solubility parameter (J·cm⁻³)^(1/2) | Absolute value of the difference of the solubility parameters between adjacent layers (J·cm⁻³)^(1/2) | Cohesive energy density (J/cm³) | Absolute value of the difference of the cohesive energy density between adjacent layers (J/cm³) |
|---|---|---|---|---|---|---|
| | Modified polyethylene EAA Linear low density polyethylene LLDPE + Modified polyethylene EAA | 0.9220 | 8.18 | 0.07 | 66.91 | 1.14 |
| | Maleic anhydride grafted modified polyethylene EAA + high density polyethylene HDPE + high density polyethylene HDPE | 0.9300 | 8.28 | 0.10 | 68.58 | 1.65 |
| PO1 | Polyester PET | 1.4000 | 19.90 | 11.62 | 396.01 | 327.45 |
| POX | Maleic anhydride grafted modified polyethylene EAA + high density polyethylene HDPE | 0.9300 | 8.28 | 1.62 | 68.56 | 327.45 |
| | Linear low density polyethylene LLDPE + Modified polyethylene EAA | 0.9230 | 8.18 | 0.10 | 66.91 | 1.65 |
| | MPE + modified polyethylene EVA | 0.9140 | 8.06 | 0.12 | 64.96 | 1.65 |
| PO3 | High density polyethylene HDPE | 0.9600 | 8.00 | 0.06 | 64.00 | 0.96 |

The solubility parameter and the cohesive energy density of the material between the 1st bonding layer in the POY bridge and the PO2 layer are based on the 1st bonding layer material and transitioned to PO2 layer in a decrement way; the solubility parameter and the cohesive energy density of the material between the 2nd bonding layer in the POX bridge and the PO3 layer are based on the 2nd bonding layer material and transitioned to PO3 layer in a decrement way.

Embodiment 8, Embodiment 9 and Embodiment 10 are embodiments of the second technical solution of the present invention.

Embodiment 8

In the structure of multilayer film, PO2 layer is LDPE+ modified polyethylene; POY layer is high density polyethylene/modified polyethylene/high density polyethylene+ethylene-octene copolymer/low density polyethylene LDPE/ maleic anhydride grafted low density polyethylene, the number of layers is four; PO1 layer is ethylene-vinyl alcohol copolymer; the 2nd bonding layer TIE2 is maleic anhydride grafted low density polyethylene; PO3 layer is LDPE+ modified low density polyethylene. See Table 8:

TABLE 8

| Layer | Polymer | Density (g/cm³) | Solubility parameter (J·cm⁻³)^(1/2) | Absolute value of the difference of the solubility parameters between adjacent layers (J·cm⁻³)^(1/2) | Cohesive energy density (J/cm³) | Absolute value of the difference of the cohesive energy density between adjacent layers (J/cm³) |
|---|---|---|---|---|---|---|
| PO2 | LDPE + modified polyethylene EVA | 0.9220 | 8.14 | 0.10 | 64.16 | 1.61 |
| POY | High density polyethylene HDPE + Modified polyethylene EVA | 0.9580 | 8.05 | | 65.77 | |
| | High density polyethylene HDPE + ethylene-octene copolymer | 0.9500 | 7.95 | 0.07 | 66.91 | 1.14 |
| | Low density polyethylene LDPE | 0.9200 | 7.90 | 0.10 | 68.56 | 1.65 |
| | Maleic anhydride grafted low density polyethylene MPE | 0.9100 | 7.90 | | | |

TABLE 8-continued

| Layer | Polymer | Density (g/cm³) | Solubility parameter (J·cm⁻³)^(1/2) | Absolute value of the difference of the solubility parameters between adjacent layers (J·cm⁻³)^(1/2) | Cohesive energy density (J/cm³) | Absolute value of the difference of the cohesive energy density between adjacent layers (J/cm³) |
|---|---|---|---|---|---|---|
| PO1 | Ethylene-vinyl alcohol copolymer EVOH | 1.1600 | 12.90 | 11.62 | 396.01 | 327.45 |
| TIE2 | Maleic anhydride grafted modified low density polyethylene MPE | 0.9100 | 7.80 | 1.62 | 68.56 | 327.45 |
| PO3 | High density polyethylene HDPE | 0.9250 | 7.9 | 0.06 | 64.00 | 0.96 |

The absolute value of the difference of the solubility parameters between the PO1 layer and the PO2 layer material is 4.76 (J·cm-3)½, 4.76 (J·cm-3)½>0.5 (J·cm-3)½, and the absolute value of the difference of the cohesive energy density between the PO1 layer and the PO2 layer material is 100.15 J/cm3, 100.15 J/cm3>5 J/cm3, and the POY bridge is provided with a 1st bonding layer and the 1st bonding layer contacts the PO1 layer, and it makes the absolute value of the difference of the solubility parameters between the 1st bonding layer and the PO2 layer material to be 0.24 (J·cm-3)½, and meanwhile, it makes the absolute value of the difference of the cohesive energy density between the 1st bonding layer and PO2 layer material to be 3.85 J/cm3, 3 J/cm3<3.85 J/cm3<5 J/cm3, and the solubility parameter and the cohesive energy density of the material between the 1st bonding layer in the POX bridge and the PO2 layer are based on the 1st bonding layer material and transitioned to PO2 layer in an increment way; the absolute value of the difference of the solubility parameters between adjacent layers from the PO1 layer to the POY bridge and to the PO2 layer is less than 0.1 (J·cm-3)½, and the absolute value of the difference of the cohesive energy density between adjacent layers is less than 3 J/cm3.

The material of the 1st bonding layer is a maleic anhydride grafted copolymer with an adjacent layer as a carrier and the carrier is the material in the POY bridge that is in direct contact with the 1st bonding layer (low density polyethylene).

Embodiment 9

See Table 9:

TABLE 9

| Layer | Polymer | Density (g/cm³) | Solubility parameter (J·cm⁻³)^(1/2) | Absolute value of the difference of the solubility parameters between adjacent layers (J·cm⁻³)^(1/2) | Cohesive energy density (J/cm³) | Absolute value of the difference of the cohesive energy density between adjacent layers (J/cm³) |
|---|---|---|---|---|---|---|
| PO2 | High density polyethylene HDPE + Modified polyethylene (EVA) | 0.9580 | 8.05 | 0.09 | 64.80 | 1.46 |
| POY | LDPE + modified polyethylene EVA | 0.9220 | 8.14 | | 66.26 | |
| | Low density polyethylene LDPE + EAA | 0.9220 | 8.20 | 0.06 | 67.24 | 0.98 |
| | Maleic anhydride grafted modified low density polyethylene EAA + high density polyethylene HDPE | 0.9300 | 8.28 | 0.08 | 68.56 | 1.32 |
| PO1 | Polyester PET | 1.3000 | 19.90 | 11.62 | 396.01 | 327.45 |
| TIE2 | Maleic anhydride grafted modified low density polyethylene EAA | 0.9300 | 9.10 | 10.80 | 82.81 | 313.20 |

TABLE 9-continued

| Layer | Polymer | Density (g/cm³) | Solubility parameter (J · cm⁻³)^(1/2) | Absolute value of the difference of the solubility parameters between adjacent layers (J · cm⁻³)^(1/2) | Cohesive energy density (J/cm³) | Absolute value of the difference of the cohesive energy density between adjacent layers (J/cm³) |
|---|---|---|---|---|---|---|
| PO3 | Low density polyethylene LDPE | 0.9300 | 7.90 | 1.20 | 62.41 | 20.40 |

The solubility parameter and the cohesive energy density of the material between the 1st bonding layer in the POY bridge and the PO2 layer are based on the 1st bonding layer material and transitioned to PO2 layer in a decrement way.

Embodiment 10

See Table 10:

TABLE 10

| Layer | Polymer | Density (g/cm³) | Solubility parameter (J · cm⁻³)^(1/2) | Absolute value of the difference of the solubility parameters between adjacent layers (J · cm⁻³)^(1/2) | Cohesive energy density (J/cm³) | Absolute value of the difference of the cohesive energy density between adjacent layers (J/cm³) |
|---|---|---|---|---|---|---|
| PO2 | Polypropylene | 0.9000 | 8.00 | 1.10 | 64.00 | 2.38 |
| POY | High density polyethylene HDPE + polypropylene PP | 0.9325 | 7.9 | | 62.41 | |
| | High density polyethylene HDPE + ethylene-octene copolymer | 0.9500 | 7.85 | 0.05 | 61.62 | 0.79 |
| | Low density polyethylene LDPE | 0.9200 | 7.90 | 0.05 | 62.41 | 1.57 |
| | Maleic anhydride grafted low density polyethylene LDPE | 0.9200 | 7.80 | 0.10 | 60.84 | 1.57 |
| PO1 | Polyamide PA | 1.1400 | 13.80 | 6.00 | 190.44 | 129.60 |
| TIE2 | Maleic anhydride grafted low density polyethylene LDPE | 0.9100 | 7.90 | 5.90 | 62.41 | 128.03 |
| PO3 | Ethylene-hexene copolymer + polypropylene | 0.9100 | 7.75 | 0.15 | 60.06 | 2.35 |

The solubility parameter and the cohesive energy density of the material between the 1st bonding layer in the POY bridge and the PO2 layer are based on the 1st bonding layer material and transitioned to PO2 layer in a V-shaped way.

It should be noted that the above described embodiments are only for illustration of technical concept and characteristics of present invention with purpose of making those skilled in the art understand the present invention. The technicians in this art could make change on the basis of the above embodiment, such as choosing different densities of materials, choosing different activators, etc, and thus these embodiments shall not limit the protection range of present invention. The equivalent changes or modifications according to spiritual essence of present invention shall fall in the protection scope of present invention.

What is claimed is:

1. A high-performance multilayer film for packaging, wherein: the structure of the multilayer film is as follows: PO2/POY/PO1/TIE2/PO3 structure (2), in the structure (2), explicated from left to right: PO2 represents an outer layer, also known as a PO2 layer, and the material of the PO2 layer is any one or a mixture of at least two of polyethylene, polypropylene, modified polyethylene and modified polypropylene; POY represents a stretching transition bridge, also known as a POY bridge, and the material of the POY bridge is any one or a mixture of at least two of polyethylene, polypropylene, modified polyethylene and modified polypropylene; Y represents the number of layers, and Y is 2, 3, 4, . . . ; PO1 represents a main tensile layer, also known as PO1 layer, and the material of the PO1 layer is polyester; TIE2 represents a 2nd bonding layer, and the material of TIE2 layer is a maleic anhydride grafted copolymer with an adjacent layer as a carrier and the carrier is at least one of materials in the PO3 layer; PO3 represents an inner layer, also known as a PO3 layer, and the function is a heat-sealing layer and the material of the PO3 layer is any one or a mixture of at least two of polyethylene, polypropylene, modified polyethylene and modified polypropylene; the multilayer film in structure (2) is obtained once by multilayer coextrusion and biaxial stretching, wherein, the biaxial stretching is carried out by a two-step stretching method of longitudinal stretching first and transverse stretching later; the total thickness of the multilayer film is 8 micrometers to 100 micrometers, and the thickness of the PO2 layer is 8 to 20% of the total thickness of the multilayer film; the thickness of the POY bridge is 10 to 20% of the total thickness of the multilayer film; the thickness of the PO1 layer is 30 to 50% of the total thickness of the multilayer film; the selection requirements for the density of materials of the PO2 layer, the POY bridge and PO1 layer are as follows: the density of the PO1 layer is 1.3~1.4 g/cm$^3$; the density of the PO2 layer is 0.87~0.97 g/cm$^3$; the density of the POY bridge is 0.86~0.97 g/cm$^3$, the absolute value of the difference of the solubility parameters between the PO1 layer and the PO2 layer is greater than 0.5 $(J \cdot cm^{-3})^{1/2}$, and the absolute value of the difference of the cohesive energy density between the PO1 layer and PO2 layer is greater than 5 J/cm$^3$, and the POY bridge is provided with a 1st bonding layer inside and the 1st bonding layer contacts the PO1 layer and it makes the absolute value of the difference of the solubility parameters between the 1st bonding layer and the PO2 layer greater than or equal to $0.1(J \cdot cm^{-3})^{1/2}$, and less than or equal to $0.5(J \cdot cm^{-3})^{1/2}$ and makes the absolute value of the difference of the cohesive energy density between the 1st bonding layer and PO2 layer greater than or equal to 3 J/cm$^3$, and less than or equal to 5 J/cm$^3$, and the solubility parameter and the cohesive energy density of the 1st bonding layer in the POY bridge and the PO2 layer are based on the solubility parameter and the cohesive energy density of one of the 1st bonding layer material and the PO2 layer material, and the solubility parameter and the cohesive energy density of the 1st bonding layer in the POY bridge and the PO2 layer are transitioned to the solubility parameter and the cohesive energy density of other of the 1st bonding layer material and the PO2 layer material in a gradient way;

the absolute value of the difference of the solubility parameters between adjacent layers from the PO1 layer to the POY bridge and to the PO2 layer is less than or equal to $0.1(J \cdot cm^{-3})^{1/2}$, and the absolute value of the difference of the cohesive energy density between adjacent layers is less than or equal to 3 J/cm$^3$;

the material of the 1st bonding layer is a maleic anhydride grafted copolymer with an adjacent layer as a carrier and the carrier is at least one of materials in the POY bridge that are in direct contact with the 1st bonding layer, the solubility parameter and the cohesive energy density of the POY bridge material are based on the solubility parameter and the cohesive energy density of one of the PO1 layer material and the PO2 layer material, and the solubility parameter and the cohesive energy density of the POY bridge material are transitioned to the solubility parameter and the cohesive energy density of either of the PO1 layer material and the PO2 layer material in an increment and/or decrement way.

2. The high-performance multilayer film for packaging of claim 1, wherein:

the solubility parameter and the cohesive energy density of the POY bridge material are transitioned to the solubility parameter and the cohesive energy density of either of the PO1 layer material and the PO2 layer material in a V-shaped gradient way.

3. The high-performance multilayer film for packaging of claim 1, wherein:

the solubility parameter and the cohesive energy density of the POY bridge material are transitioned to the solubility parameter and the cohesive energy density of either of the PO1 layer material and the PO2 layer material in a W-shaped gradient way.

4. The high-performance multilayer film for packaging of claim 1, wherein:

the solubility parameter and the cohesive energy density of the POY bridge material are transitioned to the solubility parameter and the cohesive energy density of either of the PO1 layer material and the PO2 layer material in a M-shaped gradient way.

* * * * *